US012767039B2

(12) United States Patent
Masuda

(10) Patent No.: US 12,767,039 B2
(45) Date of Patent: Oct. 20, 2026

(54) LIGHT CONTROL DEVICE AND NON-TRANSITORY STORAGE MEDIUM

(71) Applicant: TOYOTA JIDOSHA KABUSHIKI KAISHA, Toyota (JP)

(72) Inventor: Sho Masuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 18/944,846

(22) Filed: Nov. 12, 2024

(65) Prior Publication Data

US 2025/0178521 A1 Jun. 5, 2025

(30) Foreign Application Priority Data

Dec. 5, 2023 (JP) ................................ 2023-205487

(51) Int. Cl.
*B60Q 1/14* (2006.01)

(52) U.S. Cl.
CPC ........... *B60Q 1/1446* (2013.01); *B60Q 1/143* (2013.01); *B60Q 2300/052* (2013.01); *B60Q 2300/21* (2013.01)

(58) Field of Classification Search
CPC .................. B60Q 1/1446; B60Q 1/143; B60Q 2300/052; B60Q 2300/21
See application file for complete search history.

(56) References Cited

U.S. PATENT DOCUMENTS

| | | | |
|---|---|---|---|
| 10,759,329 B2 | 9/2020 | Morimura et al. | |
| 10,946,791 B2 | 3/2021 | Morimura et al. | |
| 11,260,789 B2 | 3/2022 | Morimura et al. | |
| 2008/0100139 A1* | 5/2008 | Michiyama | B60R 1/12 307/10.8 |
| 2011/0260618 A1 | 10/2011 | Mueller et al. | |
| 2020/0150702 A1 | 5/2020 | Ueda | |
| 2020/0317115 A1 | 10/2020 | Murase et al. | |

FOREIGN PATENT DOCUMENTS

JP 2020-172123 A 10/2020

* cited by examiner

*Primary Examiner* — Rodney A Butler
(74) *Attorney, Agent, or Firm* — Sughrue Mion, PLLC

(57) ABSTRACT

A Light control device 10 having a control unit 11 for controlling irradiation state of a light unit 2 provided in a vehicle 1, wherein the control unit 11 is configured to execute following processes, executing an automatic irradiation mode for automatically switching the irradiation state to a high beam state or a low beam state based on detection values for detecting an environment around the vehicle, in the high beam state, in a case where a cancel operation of the automatic irradiation mode is input, switching the irradiation state to the low beam state during an interruption time, and adjusting an interval of the interruption time according to operation contents of the cancel operation.

4 Claims, 2 Drawing Sheets

ADJUSTMENT INTERRUPTION TIME=INTERRUPTION TIME+n × EXTENSION TIME

ADJUSTMENT INTERRUPTION TIME=INTERRUPTION TIME+n × EXTENSION TIME

LIGHT CONTROL DEVICE AND NON-TRANSITORY STORAGE MEDIUM

FIELD

The present invention relates to a light control device and a non-transitory storage medium capable of automatically controlling an irradiation state.

BACKGROUND

For example, Patent Literature 1 (JP 2020-172123A) discloses a light control device for a vehicle including an automatic irradiation mode capable of automatically switching between a high beam state and a low beam state in accordance with an environment around the vehicle. The light control device is configured to be able to control the light unit such that, in a case where the user performs a cancel operation for canceling the automatic irradiation mode, the length of the interruption time is adjusted according to the speed of the vehicle, and the automatic irradiation mode is temporarily canceled at the interruption time.

SUMMARY

According to the device described in Patent Document 1, in a case where, the user performs a predetermined operation to cancel the automatic irradiation mode, and the automatic irradiation mode is executed after the interruption time elapses, the state of the environment around the vehicle is maintained in the state of the environment at the time of cancellation, and it may not be necessary to return to the irradiation state of the light unit. In such a case, the user needs to repeat the cancel operation, which can be difficulty.

An object of the present invention is to provide a light control device and a non-transitory storage medium capable of adjusting a cancellation state of an automatic irradiation mode that automatically controls an irradiation state.

One aspect of the present invention is a light control device having a control unit for controlling the irradiation state of a light unit provided in a vehicle, wherein the control unit is configured to execute the following processes:

- executing an automatic irradiation mode for automatically switching the irradiation state to a high beam state or a low beam state based on detection values for detecting an environment around the vehicle;
- in the high beam state, in a case where a cancel operation of the automatic irradiation mode is input, switching the irradiation state to the low beam state during an interruption time; and
- adjusting an interval of the interruption time according to operation contents of the cancel operation.

According to the present invention, it is possible to adjust the cancellation state of the automatic irradiation mode in which the irradiation state is automatically controlled.

DESCRIPTION OF EMBODIMENTS

Figure 1:
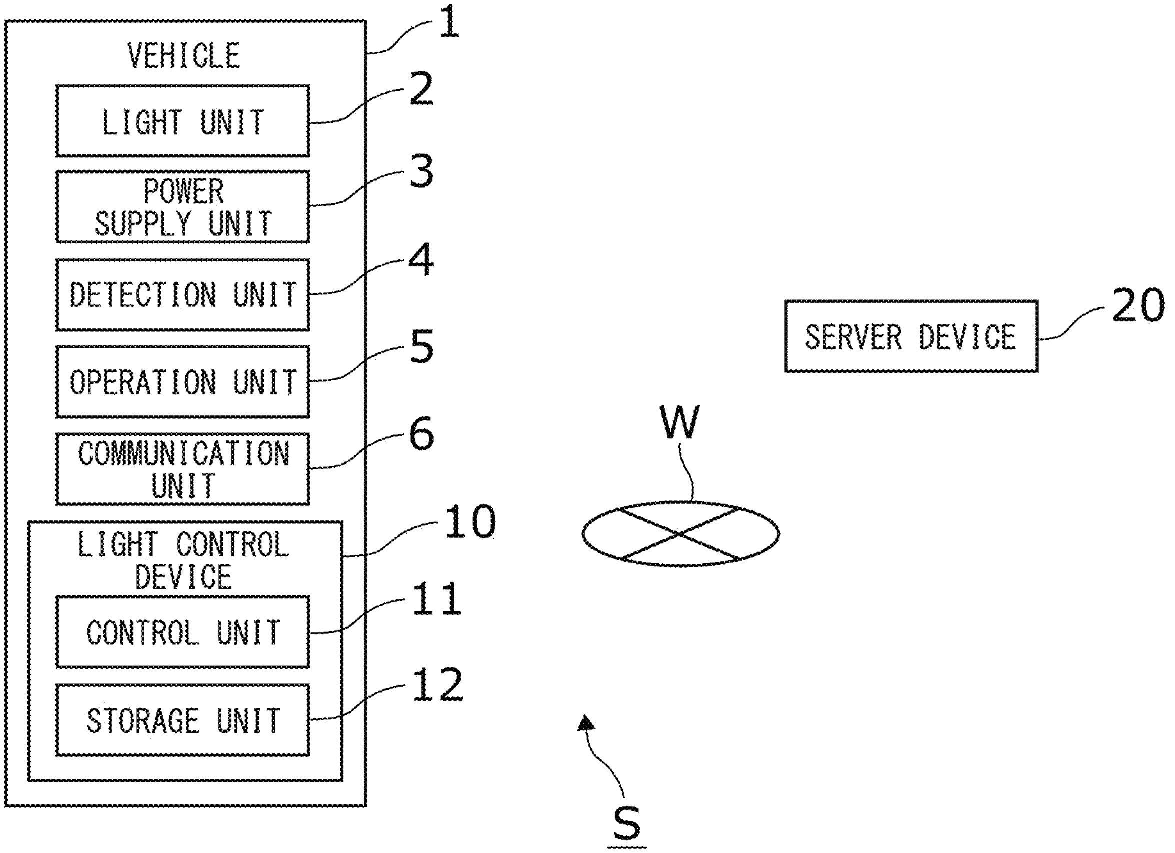
FIG. 1 is a block diagram showing a configuration of the light control device according to the embodiment.

As shown in FIG. 1, the vehicle system S includes a vehicle 1 and a server device 20 communicably connected to the vehicle 1 via a network W. The vehicle 1 includes a communication unit 6 connectable to the network W and communicates with the server device 20. The vehicle 1 transmits data related to traveling to the server device 20, and periodically receives data and an update program necessary for the traveling of the vehicle 1 from the server device 20.

The vehicle 1 includes a light unit 2 that irradiates the front region, a detection unit 4 that monitors the environment around the vehicle 1, and a light control device 10 that controls the light unit 2. The light unit 2 includes, for example, light sources capable of switching an irradiation state. The light unit 2 includes, for example, light sources capable of switching between a high beam state and a low beam state. The light unit 2 may include a light source for a high beam state and a light source for a low beam state or may include a light source capable of switching between a high beam state and a low beam state by switching the optical axis. The light unit 2 may be configured to be capable of switching between a high beam state and a low beam state by adjusting an irradiation range irradiated by a plurality of light sources.

The light unit 2 is configured to be capable of switching the irradiation state, for example, based on the operation content input to the operation unit 5 provided in the vehicle 1. The light unit 2 selects a manual irradiation mode and an automatic irradiation mode that automatically switches to a high beam state, or a low beam state based on the operation content input to the operation unit 5. The operation unit 5 is constituted by a physical switch for operating the light unit 2. The operation unit 5 may be constituted by a display image for operation displayed on a display device such as a touch panel. The operation unit 5 may be input by a smartphone carried by the user. The operation unit 5 may be configured to input operation content based on sound or gesture.

The light unit 2 is supplied with electric power from a power supply unit 3 provided in the vehicle 1. The power supply unit 3 includes, for example, a chargeable and dischargeable secondary battery and a control circuit that controls charge and discharge power. The power supply unit 3 may include a power generation device such as a fuel cell. A power generation device of an engine vehicle may be connected to the power supply unit 3. In a case where the vehicle 1 is an electric vehicle, the power supply unit 3 may be configured to supply electric power not only for the light unit 2 but also for traveling.

The detection unit 4 is constituted by a plurality of sensors capable of detecting the environment around the vehicle 1. The detection unit 4 may include, for example, a camera that captures an image of the surroundings of the vehicle 1. The detection unit 4 may include, for example, a rider device or a radar device that detects an object around the vehicle 1. For example, the detection unit 4 may perform inter-vehicle communication with another vehicle existing around the vehicle 1 via the communication unit 6 and acquire detection values from another vehicle. For example, the detection unit 4 may communicate with a terminal device of a traffic participant such as a pedestrian present around the vehicle 1 via the communication unit 6 and acquire detection values from the terminal device of the traffic participant.

The detection unit 4 may include, for example, a position sensor that detects the current position of the vehicle 1. The detection unit 4 may include, for example, a six-axis sensor that detects the posture and acceleration of the vehicle 1, and may be configured by, for example, a navigation device that calculates a path to a destination of the vehicle 1. In addition, the detection unit 4 may include a sensor used for driving and driving support of the vehicle 1 and may include other sensors if it can detect information necessary for the vehicle 1 to travel. The detection unit 4 outputs detection values of a predetermined sensor to the light control device 10.

The light control device 10 is a computer device configured to control an irradiation state of the light unit 2. The light control device 10 includes a control unit 11 that controls an irradiation state of the light unit 2, and a storage unit 12 that stores data and a computer program necessary for the control. The control unit 11 is constituted by a hardware processor such as at least one CPU (Central Processing Unit). The storage unit 12 includes a non-transitory storage medium such as a hard disk drive (HDD) or a solid-state disk (SSD).

In the case of the manual mode, the control unit 11 switches the irradiation state of the light unit 2 based on the operation content input to the operation unit 5. Control unit 11, in a case where the low beams operation corresponding to the low beams to the operation unit 5 is inputted, to maintain the light unit 2 in a low beams state. When a high beam operation corresponding to a high beam is input to the operation unit 5, the control unit 11 maintains the light unit 2 in a high beam state.

When the automatic irradiation mode operation corresponding to the automatic irradiation mode is input to the operation unit 5, the control unit 11 executes the automatic irradiation mode in which the irradiation state of the light unit 2 is automatically switched to the high beam state or the low beam state. In the automatic irradiation mode, the control unit 11 acquires the detection values detected by the detection unit 4 that detects the environment around the vehicle 1 and controls the light unit 2 based on the detection values to switch the irradiation state. The control unit 11 determines whether the light unit 2 can be maintained in the high beam state based on the detection values.

Based on the detection values, the control unit 11 determines whether there is an object that causes a trouble in traveling in a high beam state such as an oncoming vehicle or a preceding vehicle in a first irradiation range in a high beam state ahead of the vehicle 1. When it is determined that the object does not exist in the first irradiation range, the control unit 11 controls the light unit 2 to maintain the high beam state. When it is determined that an object is present in the first irradiation range in the high beam state, the control unit 11 controls the light unit 2 to switch from the high beam state to the low beam state and maintains the low beam state. In the low beam state. On the other hand, when it is determined that an object is not present in the first irradiation range, the control unit 11 controls the light unit 2 to switch from the low beam state to the high beam state and maintains the high beam state.

Based on the detection values, the control unit 11 may determine the presence of an object not only in the current irradiation range, but also in the irradiation range within a predetermined time in the future. The control unit 11 may generate a schedule of a future irradiation state based on the determination result and control the irradiation state of the light unit 2 based on the schedule.

The automatic irradiation mode may be cancelled when the cancel operation is input to the operation unit 5 of the user, in a case where the cancel operation of the automatic irradiation mode is input to the operation unit 5 in the high beam state, the control unit 11 switches the irradiation state of the light unit 2 to the low beam state during the interruption time. In this case, the control unit 11 adjusts the interval of the interruption time according to the operation content of the cancel operation input to the operation unit 5. In a case where the cancel operation is input again after the cancel operation is input, the control unit 11 sets an adjustment interruption time in which the interruption time is increased and executes a process of switching the irradiation state to the low beam state during the adjustment interruption time. The control unit 11 may set an adjustment interruption time in which the length of the interruption time is adjusted based on the number of cancel operations or the operation time interval of the cancel operations.

Figure 2:
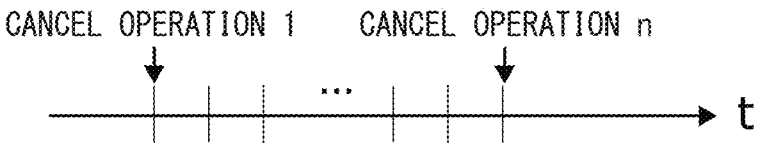
FIG. 2 is a diagram illustrating an example of a method of setting an adjustment interruption time.

As shown in FIG. 2, in a case where the cancel operation is input again to the interruption time corresponding to one cancel operation, the control unit 11 sets an adjustment interruption time in which a predetermined extension time is added to the interruption time. For example, in a case where the cancel operation is continuously input a plurality of times again within a predetermined time after the first cancel operation, the control unit 11 sets an adjustment interruption time obtained by adding an extension time multiplied by the number of cancel operations to the interruption time.

Figure 3:
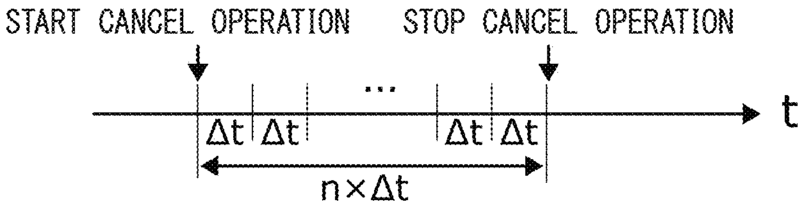
FIG. 3 is a diagram showing another example of a method of setting the adjustment interruption time.

As shown in FIG. 3, for example, the control unit 11 may adjust the adjustment interruption time in accordance with an operation time such as a long pressing operation in the input operation method of the cancel operation. The control unit 11 sets an adjustment interruption time proportional to the operation time of the long pressing operation of the cancel operation. For example, the control unit 11 sets the adjustment interruption time by multiplying the values (n) obtained by dividing the operation time of the long pressing operation by the unit time (Δt) by the extension time. In a case where a cancel operation for extending the interruption time is input, the control unit 11 may cause a display unit (not shown) provided in the vehicle 1 to display the adjustment interruption time. In the low beam state, in a case where the cancel operation of the automatic irradiation mode is input to the operation unit 5, the control unit 11 may switch the irradiation state of the light unit 2 to the low beam state during the interruption time.

In a case where the cancel operation is input, the control unit 11 may store the detection values and the data set related to the operation content of the cancel operation in the storage unit 12. In a case where a predetermined number of data sets are obtained, the control unit 11 may adjust the parameters of the determination algorithm of the automatic irradiation mode. The control unit 11 may store the data set including the position data of the vehicle 1 in the storage unit 12 and may automatically execute the operation content of the cancel operation in a case where it is determined that the cancel operation is in the state in the predetermined area, or in a case where the vehicle 1 is traveling in the predetermined area.

The control unit 11 may transmit the data set to the server device 20 via the network W. The server device 20 may update the parameters of the determination algorithm of the automatic irradiation mode by using the data sets obtained from the plurality of vehicles 1 as the teacher data of the machine learning. The server device 20 may transmit the updated program of the determination algorithm to the vehicle 1 at a predetermined timing to update the determination algorithm of the vehicle 1.

Figure 4:
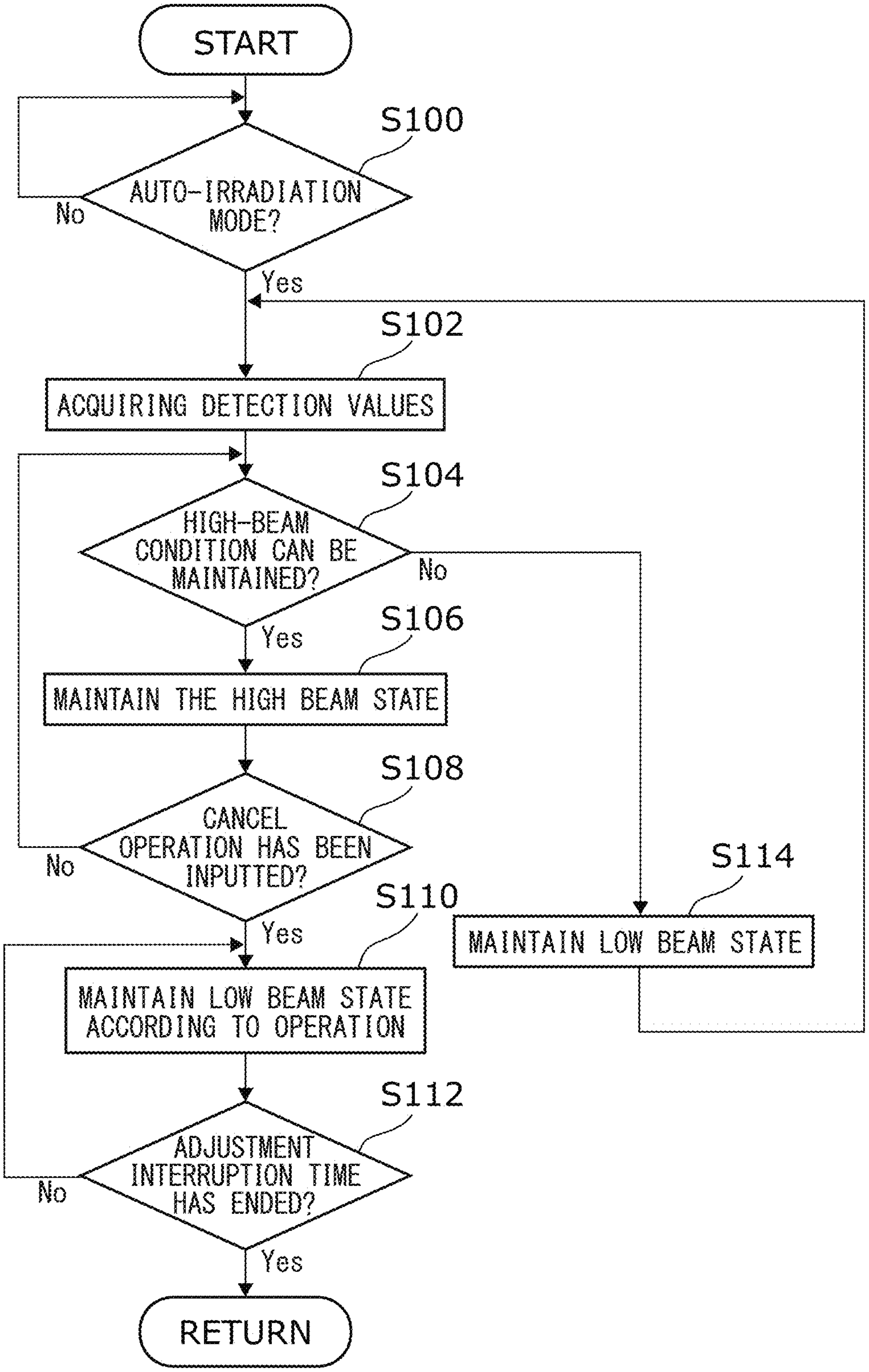
FIG. 4 is a flowchart showing a flow of processing of the light control method.

FIG. 4 shows a flow of processing of a light control method executed in the light control device 10. The light control method is executed based on a computer program installed in a computer installed in the light control device 10. The control unit 11 determines whether the light unit 2 is in the automatic irradiation mode based on the operation content of the operation unit 5 (step S100). In a case where the operation of switching to the automatic irradiation mode is inputted to the operation unit 5, the control unit 11 starts the automatic irradiation mode in which the irradiation state is automatically switched to the high beam state or the low beam state in the light unit 2 and acquires detection values for detecting the environment around the vehicle 1 from the detection unit 4 (step S102).

The control unit 11 determines whether the high beam condition can be maintained (step S104). In a case where it is determined that the high beam state can be maintained, the control unit 11 controls the light unit 2 to maintain the high beam state (step S106). The control unit 11 determines whether a cancel operation of the automatic irradiation mode has been inputted to the operation unit 5 (step S108). In a case where a cancel operation is inputted to the operation unit 5, the control unit 11 adjusts the interval of the interruption time in accordance with the operation content of the cancel operation and switches the irradiation state to the low beam state during the adjustment interruption time (step S110).

The control unit 11 determines whether the adjustment interruption time has ended (step S112). In a case where the adjustment interruption period has not ended in the step S112, the control unit 11 returns the process to the step S110 and maintains the low beam condition. In a case where it is determined that the high beam state cannot be maintained in the step S104, the control unit 11 controls the light unit 2 to maintain the low beam state (step S114).

As described above, according to the light control device 10, in a case where the automatic irradiation mode is executed and a cancel operation of the high beam state is input by the user, the interruption time can be adjusted based on the operation content of the cancel operation, and the low beam state can be maintained. According to the light control device 10, since the adjustment interruption time is set based on the operation content of the cancel operation, the low beam state can be maintained during the adjustment interruption time desired by the user.

In the above-described embodiment, the computer program executed in each configuration of the light control device 10 may be provided in a form recorded in a computer-readable portable recording medium such as a semiconductor memory, a magnetic recording medium, or an optical recording medium. In the embodiments described above, various additions, substitutions, changes, partial deletions, and the like can be made without departing from the gist of the invention or without departing from the spirit and spirit of the invention derived from the contents described in the claims and equivalents thereof.

The light control device 10 may be applied not only to an electric vehicle but also to a vehicle having an internal combustion engine. The light control device may be applied to a hybrid vehicle including an internal combustion engine. The light control device may be applied to a vehicle including not only four wheels but also two wheels and four or more wheels. The light control device 10 may be applied to an automated driving vehicle or a manual driving vehicle. The light control device 10 may be applied to a human-powered vehicle such as a bicycle. The light control device 10 may be provided as a computer product.

The invention claimed is:

1. A light control device for controlling irradiation state of a light unit provided in a vehicle, wherein the light control device comprises:

at least one memory storing instructions; and at least one processor configured to execute the instructions to perform:

executing an automatic irradiation mode for automatically switching the irradiation state to a high beam state or a low beam state based on detection values for detecting an environment around the vehicle;

based on the irradiation state being the high beam state and receiving a first cancel operation of the automatic irradiation mode, switching the irradiation state to the low beam state and maintaining the low beam state for an interruption time period; and adjusting an interval of the interruption time period based on one or more additional cancel operations, wherein adjusting the interval of the interruption time period based on the one or more additional cancel operations comprises:

receiving a second cancel operation during the interruption time period; and based on receiving the second cancel operation, increasing the interval of the interruption time period, increasing the interval of the interruption time period comprises:

adjusting the length of the interruption time period based on an operation time interval associated with the second cancel operation, or adjusting the length of the interruption time period based on the second cancel operation and one or more third cancel operations, the second cancel operation is received within a time period after receiving the first cancel operation, and the interval of the interruption time period is increased as a result of the second cancel operation being received within the time period.

2. A non-transitory storage medium for controlling a light control device for controlling an irradiation state of a light unit provided in a vehicle, wherein the non-transitory storage medium is configured to cause a computer to execute the following processes:

executing an automatic irradiation mode for automatically switching the irradiation state to a high beam state or a low beam state based on detection values for detecting an environment around the vehicle;

based on the irradiation state being the high beam state and receiving a first cancel operation of the automatic irradiation mode, switching the irradiation state to the low beam state and maintaining the low beam state for an interruption time period; and adjusting an interval of the interruption time period based on one or more additional cancel operations, wherein adjusting the interval of the interruption time period based on the one or more additional cancel operations comprises:

receiving a second cancel operation during the interruption time period; and based on receiving the second cancel operation, increasing the interval of the interruption time period, increasing the interval of the interruption time period comprises:

adjusting the length of the interruption time period based on an operation time interval associated with the second cancel operation, or adjusting the length of the interruption time period based on the second cancel operation and one or more third cancel operations, the second cancel operation is received within a time period after receiving the first cancel operation, and the interval of the interruption time period is increased as a result of the second cancel operation being received within the time period.

3. The light control device according to claim 1, wherein adjusting the interval of the interruption time period based on the one or more additional cancel operations comprises:

receiving a plurality of cancel operations during the interruption time period; and based on receiving the plurality of cancel operations, increasing the interval of the interruption time period based on a number of cancel operations of the plurality of cancel operations.

4. The light control device according to claim 1, wherein the at least one processor is configured to execute the instructions to perform:

adjusting the automatic irradiation mode based on the data associated with the first cancel operation.

* * * * *